United States Patent [19]

Grossauer

[11] Patent Number: 4,542,922
[45] Date of Patent: Sep. 24, 1985

[54] FITTING FOR CONNECTING CIRCUMFERENTIALLY RIBBED INSULATING TUBES OF PLASTIC

[75] Inventor: Alfred Grossauer, Stansstad, Switzerland

[73] Assignee: Agro Ag., Switzerland

[21] Appl. No.: 461,009

[22] Filed: Jan. 26, 1983

[30] Foreign Application Priority Data

Feb. 5, 1982 [CH] Switzerland .......................... 699/82

[51] Int. Cl.$^4$ ............................................. F16L 39/00
[52] U.S. Cl. .................................... 285/320; 285/423; 285/DIG. 4
[58] Field of Search ...................... 285/320, 7, DIG. 4, 285/319, DIG. 22, 423

[56] References Cited

U.S. PATENT DOCUMENTS

| | | | |
|---|---|---|---|
| 1,253,309 | 1/1918 | Ulleland | 285/320 X |
| 3,244,437 | 4/1966 | Belicka et al. | 285/7 |
| 3,250,551 | 5/1966 | Draudt | 285/7 |
| 3,602,009 | 8/1971 | Powell | 285/320 X |
| 3,694,007 | 9/1972 | Crow et al. | 285/DIG. 4 X |
| 4,214,779 | 7/1980 | Losell | 285/319 X |
| 4,248,459 | 2/1981 | Pate et al. | 285/319 |
| 4,441,745 | 4/1984 | Nicholas | 285/319 |

Primary Examiner—Thomas F. Callaghan
Attorney, Agent, or Firm—McGlew and Tuttle

[57] ABSTRACT

A fitting for connecting tubes which have circumferentially extending axially spaced ribs with recesses defined between the ribs comprises a socket member which advantageously has a cavity at one end of smaller diameter than a cavity at its opposite end which is adapted to receive the tube. The ledge is formed between the two cavities and a resilient member such as a sealing sleeve is disposed against the ledge at the inner end of the larger diameter cavity. The tube to be connected is positioned in the larger diameter cavity against the sealing sleeve such that its ribbed circumference underlies the slot in the larger diameter cavity which is closable by a locking fitting. The locking fitting includes an inner end which is adapted to be secured to the socket and which in one embodiment includes a bending strip which is affixed to the socket and supports the remaining portion of the locking lid at an acute angle with respect to the exterior surface of the socket. The locking lid at its opposite end includes a bevelled lip which is engageable under the interior surface of the opposite edge of the slot. The locking lid includes one or more projections or ribs at its interior surface which are spaced apart so that they each engage in a recess between the ribs of the tube. After the outer bevelled lip of the locking element is engaged beneath the surface of the edge of the socket member bounding the slot the tube is locked in position within the fitting.

1 Claim, 12 Drawing Figures

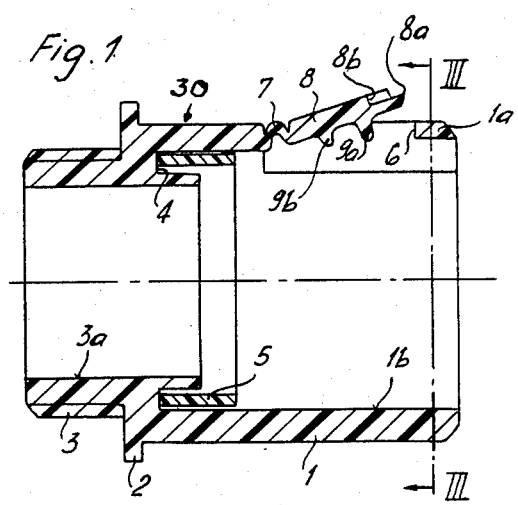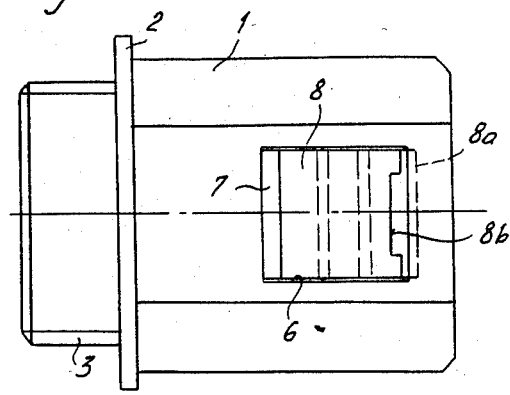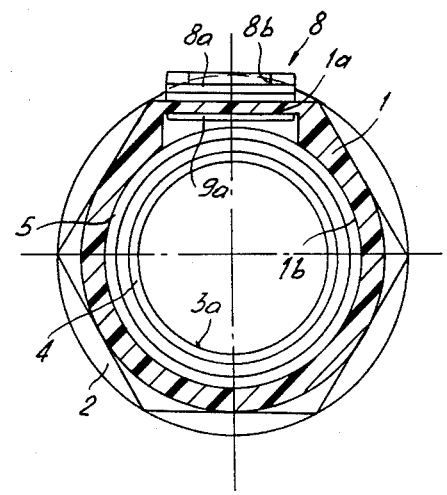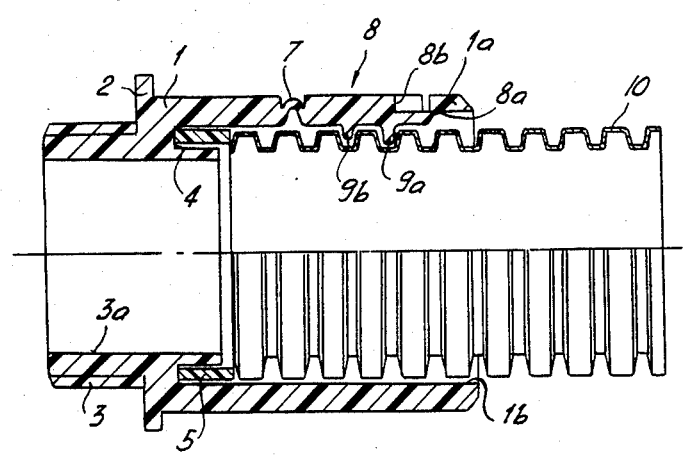

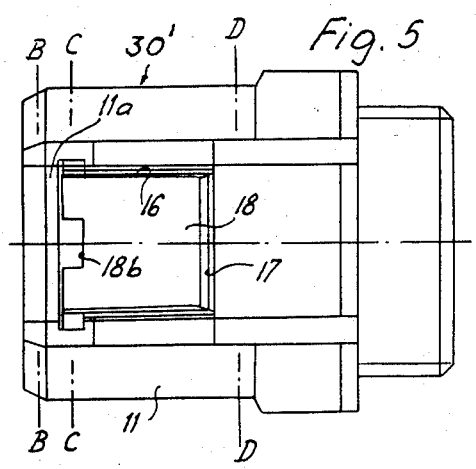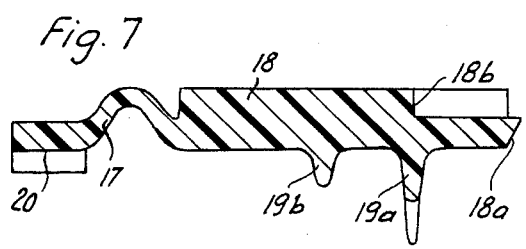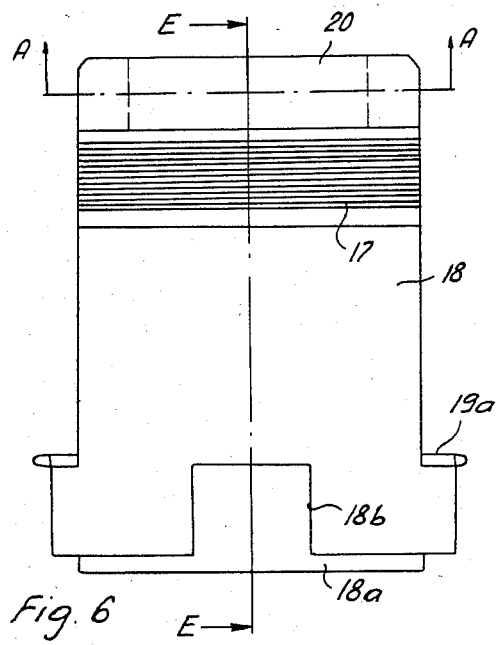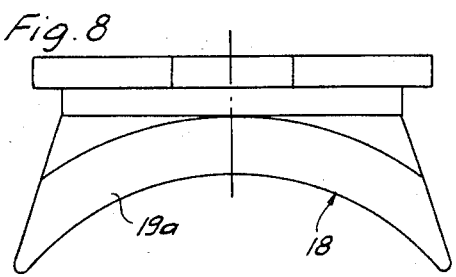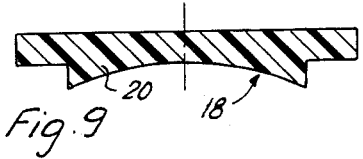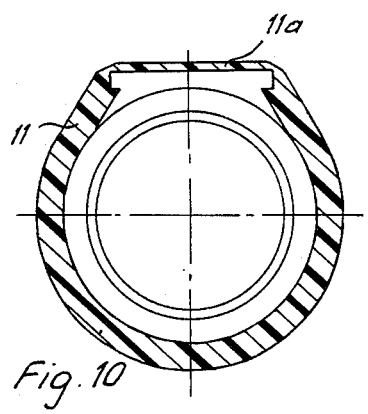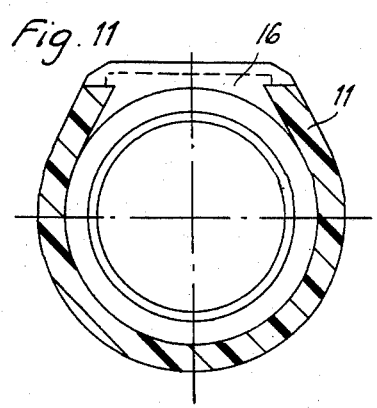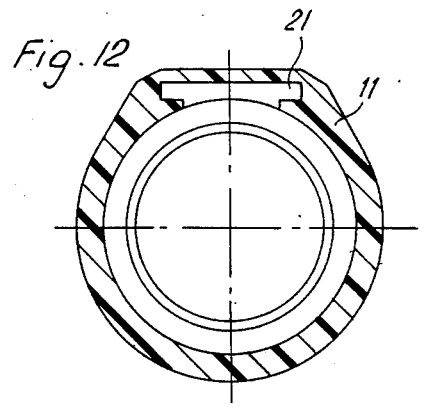

FITTING FOR CONNECTING CIRCUMFERENTIALLY RIBBED INSULATING TUBES OF PLASTIC

FIELD AND BACKGROUND OF THE INVENTION

The invention relates in general to couplings and in particular to a new and useful fitting for connecting circumferentially ribbed insulating tubes of plastic.

There are known fittings for connecting such insulating tubes intended to enclose electrical cables, which are equipped with a locking element which can be inserted in a recess in the wall of the tube receiving socket of the fitting and is provided with projections to be engaged with circumferential grooves of the insulating tube. For example, known is a U-shaped locking element which, upon introducing the insulating tube, is inserted through a wall recess to straddle the insulating tube and engage the circumferential grooves of the tube by its projections, while the resilient legs of the locking element engage behind webs by which the recess is interrupted and thus prevent the locking element from being unlocked without a tool. Aside from the fact that such a locking element extending over about 180° of the circumference of the receiving socket is relatively complicated to manufacture, the interruption of the wall recess by webs for anchoring the element requires a relative extensive recess in the wall. Moreover, the manufacture, supply and handling of separate locking elements is undesirable.

The present invention is therefore directed to a fitting comprising a locking element fixed thereto and being particularly simple to manufacture and handle, while still being manually engageable into its effective position and prevented from being disengaged therefrom without a tool.

In accordance with the invention a fitting is provided which includes a cylindrical member having an opening at each end with one end advantageously being of a smaller diameter than the opposite end so as to form a ledge therebetween through which a sealing element such as a sealing sleeve or ring is placed. The fitting is used for connecting a tube which has circumferentially extending axially spaced ribs defining recesses between the ribs on its exterior surface. The tube is placed in the large diameter portion and abuts against the sealing ring and it is locked within the fitting by a locking lid which is positionable in a slot of the socket which overlies the exterior circumferential tube. The locking lid includes a portion which is connected to the socket and is flexible and holds the fitting at an acute angle in inoperative position above the surface of the socket. After insertion of the tube the locking lid is closed forcing an outer bevelled lip past the edge of the slot so that it underlies the interior of the socket. In this position the locking lid includes a projection which extends into a recess between the ribs of the tube so that it locks the tube in position.

The firm connection between the receiving socket and the locking lid particularly simplifies the handling of the locking element. Further, the socket may be designed as a polyhedral body, with the recess and the locking lid being provided in one of the plane faces thereof. In a particularly advantageous embodiment of the invention, the wall thickness of the rectangular locking lid is substantially equal to that of the receiving socket while the bending strip forming the hinge and the free end to be engaged below the edge of the recess have a reduced wall thickness, so that the lid when it is in an effective position is flush with the polyhedral face. Since a single, circumferentially relatively narrow recess is needed in the socket, the socket wall is not noticeably weakened. The axial length of the recess and thus of the working lid is advantageously such as to be able to provide, on the inside of the lid, two or three projections designed as cross ribs having edges comformable to the concavity of the socket and being spaced apart in accordance with the spacing of the ribs of the insulating tube to be inserted. It has been found particularly advantageous to provide the inwardly projecting, jutting portions of the lid in an arrangement such that in the effective position of the lid, they engage the ribs of the insulating tube to urge the tube inwardly, into the socket, against a sealing sleeve accommodated therein. The corresponding reacting force of the sealing sleeve then urges the free end of the lid reliably below the edge strip, whereby an unassisted disengagement of the lid from its effective position, for example due to shocks, vibrations, etc. is virtually prevented.

Accordingly it is an object of the invention to provide an improved fitting for connecting tubes which have circumferentially extending axially spaced ribs, which includes a locking lid which is connected to a socket member receiving the tube by a bending strip portion of the locking lid which orients the lid at an acute angle from the surface of the socket and permits the locking lid to be bent inwardly so that projections on the interior surface of the socket engage into the recesses of the tube and lock it in position.

A further object of the invention is to provide a fitting for connecting tubes which is simple in design, rugged in construction and economical to manufacture.

The various features of novelty which characterize the invention are pointed out with particularity in the claims annexed to and forming part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is an axial sectional view of a connecting fitting constructed in accordance with the invention, with the locking lid in an ineffective position;

FIG. 2 is a top plan view of the fitting shown in FIG. 1, with the locking lid being in its effective position;

FIG. 3 is a sectional view taken along the line III—III of FIG. 1;

FIG. 4 is an axial sectional view of the fitting of FIG. 1, showing the fitting with an inserted insulating tube and the backing lid in effective position;

FIG. 5 is a top plan view similar to FIG. 2, but showing another embodiment of the fitting;

FIG. 6 is an enlarged top plan view of the locking lid in accordance with FIG. 5;

FIG. 7 is a sectional view taken along the line E—E of FIG. 6;

FIG. 8 is a front view corresponding to the locking lid of FIG. 6;

FIG. 9 is a sectional view taken along the line A—A of FIG. 6; and

FIGS. 10, 11 and 12 are radial sectional views of the fitting (without the locking lid), taken along the lines B—B; C—C and D—D of FIG. 5.

GENERAL DESCRIPTION OF THE PREFERRED EMBODIMENTS

Referring to the drawings in particular the invention embodied therein comprises a fitting generally designated 30 which in the embodiment of FIGS. 1 to 4 includes a receiving socket 1 for a tube 10 which has circumferentially extending axially spaced ribs defining recesses therebetween. In accordance with the invention the locking lid 8 includes at least one rib 9a which engages into the recesses between the ribs of the tube 10.

The shown fitting of plastic comprises a receiving socket 1 which is designed outside as a hexahedral body with an adjoining flange 2 separating the body from a coaxial threaded connection 3 by which the footing is to be secured, for example, in the housing wall of an apparatus. In the intermediate zone between the bore or cavity 1b of socket 1 and the smaller-diameter cavity 3a or bore of connection 3, an annular groove 4 is provided accommodating a sealing sleeve or ring 5 which extends axially into socket 1. In one of the walls of hexahedral socket 1, a rectangular recess or slot 6 is provided whose bounding edges extend in, and perpendicularly to, the axial direction of the socket and which is separated from the front edge of the socket by an edge strip 1a having a planar inside surface. The wall thickness of this edge strip 1a is less than the smallest wall thickness of socket 1. Along the cross edge remote from edge strip 1a of recess 6, a locking lid 8 fitting the recess 6 is hinged to the socket by means of a hinge or bending strip 7 which is upwardly arched and much thinner than the wall of the socket. The resilient bending strip 7a is so shaped that in an unstressed state, it holds the locking lid 8 in the ineffective position thereof (FIGS. 1, 3) in which the lid projects at an acute angle out of recess 6. The free end of locking lid 8 is provided with a bevelled lip 8a having a thickness which is reduced relative to lid 8 by the thickness of edge strip 1a. Adjacent lip 8a, a central recessed edge portion 8b is provided. Locking lid 8 has a wall thickness substantially corresponding to the smallest wall thickness of the socket 1, and is provided on its inside with two axially spaced cross ribs 9a and 9b of unequal height. The heights of the ribs are such that in the ineffective position of the lid 8, the ribs extend outside of or beyond the inside-diameter of the socket 1. The cross-section of the longer cross rib 9a, which is closer to lip 8a, is substantially equal to the axial cross section of the circumferential grooves of the insulating tube to be inserted into the socket 1, while the spacing of the cross ribs corresponds to that of the circumferential grooves of the insulating tube.

While connecting a circumferentially ribbed insulating tube 10 of suitable diameter by means of the fitting, the end portion of the tube is introduced into socket 1 until it abuts against sealing ring 5. The provided axial length of this elastic sealing ring 5 is such that with the insulating tube being applied without pressure, the circumferential grooves of insulating tube 10 are axially offset in the zone of cross-ribs 9a, 9b of lid 8 relative to the ribs by about one half the spacing of the ribs. Now, while correspondingly compressing or deforming sealing ring 5, insulating tube 10 is pushed inwardly until two circumferential grooves of insulating tube 10 are radially aligned with cross ribs 9a, 9b, whereupon lid 8 is pushed by hand and against the spring force of bending strip 7 into recess 6. This makes ribs 9a and 9b engage the respective circumferential grooves of insulating tube 10, and lid 8a comes into a position radially beneath edge strip 1a. The upper side of locking lid 8 is then about flush with the planar outer face of socket 1. Upon releasing insulating tube 10, compressed sealing ring 5 urges tube 10 away and thus, through the tube ribs and the cross ribs 9a, 9b, pushed locking lid 8 axially against edge strip 1a, under a slight deformation of bending strip 7, so that lip 8a engages below edge strip 1a to an extent such that the lip, and consequently locking lid 8, can no longer be disengaged, except with the aid of a tool, such as a screwdriver, to be applied at the recessed edge portion 8b. Insulating tube 10 is thereby axially fixed in socket 1 and safely locked in this position.

In the embodiment shown in FIGS. 5 to 12, the fitting 30' includes a receiving socket 11 which has a planar outer face which is parallel to the socket axis, and in which a recess 16 is provided being bounded at the front side by a flat, relatively thin edge strip 11a. In contradistinction to the described first embodiment, locking lid is not made in one piece with the socket, it is firmly connected to the fitting by means of an end strip 20 which extends adjacent bending strip 17 and which engages into a corresponding recess 21 (FIG. 12) of the socket wall. Recess 16 is bounded in its axial direction by inwardly diverging edge faces. The sides of the two ribs 19a and 19b of unequal height extend in corresponding, obliquely downwardly diverging directions. The inside edge of the higher of the two cross ribs is concave to conform to the circumference of the insulating tube. This makes sure that this cross rib 19a is, in its effective position, locking with an introduced insulating tube, will engage a corresponding circumferential groove of the tube not only tangentially but also over a relatively large circumferential angle. The offset lip 18a on the free end of locking lid 18 is bevelled, as in the first embodiment. A central edge portion 18b is provided having its bottom flush with the top side of lip 18a.

This locking lid 18 is effective in the same way as that of the first embodiment. Since in its ineffective position (similarly as in FIG. 1), locking lip 8 is held by bending strip 17 to slightly slope upwardly from recess 16, it can be pushed inwardly, after an insulating tube has been introduced and pressed against the sealing ring, so that cross ribs 19a, 19b engage the circumferential grooves of the insulating tube and lip 18a engages edge strip 11b from below. From this effective position, locking lid 18, or lip 18a thereof, can be disengaged from edge 11a only with the aid of a tool to be applied in recess 18b.

While specific embodiments of the invention have been shown and described in detail to illustrate the application of the principles of the invention, it will be understood that the invention may be embodied otherwise without departing from such principles.

I claim:

1. A fitting for connecting a tube which has circumferentially extending axially spaced ribs and recesses defined between the ribs, comprising a receiving socket having an opening into which the tube is fitted, said socket having a wall including a slot therein adapted to overlie the tube, a locking element engageable in the slot having one end adapted to be secured to said receiving socket and including an intermediate flexible bending portion, and an opposite end with a flexible locking lip engageable below the interior of said receiving socket in a locking position and being oriented by said bending portion to extend at an acute angle above said socket in a disengaged position, said locking element having an inner surface facing the interior of said socket with at least one tube-recess engagement rib projecting toward the interior of said socket which in the locking position engages into a recess between ribs of the tube to lock it in said socket, said socket having an interior wall with an elastic sealing member therein, the tube being adapted to be engaged against said sealing member under pressure to align the recess with the tube recess engagement rib, said locking element including on its end opposite to said bending portion a lip formed by a recessed portion of said locking element extending to a depth substantially equal to the depth of the wall of said socket member, said lip being engageable below the interior of the wall of said socket member, said locking element being connected to said socket adjacent said bending strip, said socket wall having an edge strip circumferentially continuous with said socket, said locking lip being engageable below the interior wall of said edge strip.

* * * * *